United States Patent [19]
Alford et al.

[11] 4,424,135
[45] Jan. 3, 1984

[54] EMULSIFIER SYSTEM FOR THE TERTIARY RECOVERY OF OIL

[75] Inventors: Harvey E. Alford, Amherst; Harley F. Hardman, Lyndhurst, both of Ohio

[73] Assignee: The Standard Oil Company, Cleveland, Ohio

[21] Appl. No.: 292,480

[22] Filed: Aug. 13, 1981

Related U.S. Application Data

[63] Continuation of Ser. No. 97,030, Nov. 21, 1979, abandoned.

[51] Int. Cl.³ .............................................. E21B 43/22
[52] U.S. Cl. ................................ 252/8.55 D; 166/275
[58] Field of Search ................. 252/8.55 D; 166/274, 166/275

[56] References Cited

U.S. PATENT DOCUMENTS

| | | | |
|---|---|---|---|
| 2,653,909 | 9/1953 | Frazier | 252/34.7 |
| 3,477,511 | 11/1969 | Jones et al. | 166/274 |
| 3,506,071 | 4/1970 | Jones | 166/273 |
| 4,008,769 | 2/1977 | Chang | 252/8.55 X |
| 4,258,789 | 3/1981 | Hedges et al. | 252/8.55 X |
| 4,313,835 | 2/1982 | Alford et al. | 252/8.55 |

*Primary Examiner*—Herbert B. Guynn
*Attorney, Agent, or Firm*—William A. Heidrich; Herbert D. Knudsen; Larry W. Evans

[57] ABSTRACT

In an emulsifier system for the tertiary recovery of oil comprising a surfactant and an alcohol cosurfactant, improved results are achieved if the alcohol cosurfactant is composed of a mixture of alcohols having no more than 12 carbon atoms.

2 Claims, No Drawings

EMULSIFIER SYSTEM FOR THE TERTIARY RECOVERY OF OIL

This is a continuation of application Ser. No. 097,030 filed Nov. 21, 1979, now abandoned.

BACKGROUND OF THE INVENTION

The present invention relates to a new emulsifier system for use in enhanced (tertiary) oil recovery.

Emulsifier systems for use in enhanced oil recovery commonly take the form of a mixture of a surfactant and a cosurfactant. Sodium petroleum sulfonates currently hold the most promise as surfactants while various alcohols, primarily t-butanol, are the current choice for the cosurfactant.

Unfortunately, current emulsifier systems based on mixtures of sodium petroleum sulfonates and various alcohols such as t-butanol are disadvantageous in a number of respects. For example, such emulsifier systems tend to be useful only over a comparatively narrow salinity range. In addition, the volume of emulsion produced in situ when such emulsifier systems are used is less than desired. Also, such emulsifier systems are comparatively expensive.

Accordingly, it is an object of the present invention to provide a new emulsifier system for use in enhanced oil recovery which is operable over a wider range of salinities and which provides a larger volume of emulsion in use than known emulsion systems.

It is a further object of the present invention to provide such an emulsifier system at low cost.

SUMMARY OF THE INVENTION

These and other objects are accomplished by the present invention which is based on the discovery that the use of a mixture of alcohols rather than a single alcohol as the cosurfactant will provide an emulsifier system effective over a wider salinity range and capable of providing a greater volume of emulsion in use.

Thus, the present invention provides an improvement in emulsifier systems for use in the tertiary recovery of oil and comprising a surfactant and an alcohol cosurfactant, the improvement in accordance with the present invention wherein the alcohol cosurfactant comprises a mixture of alcohols having no more than 12 carbon atoms.

DETAILED DESCRIPTION

The inventive emulsifier system in accordance with the present invention contains a cosurfactant which is composed of a mixture of alcohols.

Cosurfactant

Any mixture of alcohols having less than 12 carbon atoms can be used as the cosurfactant in accordance with the present invention. More preferred mixtures are those containing alcohols having 2 to 8 carbon atoms. Of such mixtures, those which contain no more than 70%, preferably 55% by weight, of any one particular alcohol are even more preferred. Still more preferred alcohols are those having an alcohol distribution set forth in the following Table I.

TABLE I

| | |
|---|---|
| $C_2$ | 0.0–25%, perferably 4–25% |
| $C_3$ | 0.1–25%, preferably 9–25% |
| $C_4$ | 0.5–70%, preferably 40–70% |
| $C_5$ | 0.1–12% |
| $C_6$ | 0.1–10% |
| $C_8$ | 0.1–10% | the percents being based on the weight of the total amount of alcohols in the mixture having 2 or more carbon atoms. Of such mixtures, those which are composed almost completely of isoalcohols and normal alcohols with the iso/normal ratio being about 0.7/2 are especially preferred. Also, compositions which contain essentially no methanol and no ethanol are also especially preferred.

Alcohol mixtures for use in the present invention can be produced by any technique. Preferably, however, they are produced by contacting synthesis gas with a novel copper/thorium/alkali metal oxide catalyst. Synthesis gas is composed primarily of carbon monoxide and hydrogen, and it has been found that when synthesis gas is contacted with this unique catalyst a mixed alcohol composition is produced having a $C_2$ to $C_8$ distribution in accordance with the preferred embodiments of the invention as described above in Table I. The alcohol mixtures produced by this technique also normally contain a significant amount of methanol, and thus it is desirable to distill off or otherwise remove the methanol from the alcohol composition before use in this invention. Also, if it is desirable to use an essentially ethanol-free alcohol mixture in this invention, the ethanol produced in accordance with the above technique can also be distilled off before use. Normally, the alcohol mixtures produced by this procedure are composed predominantly of primary alcohols.

The technique for making alcohol mixtures of the type described above and a more thorough description of these mixtures is described in commonly assigned application Ser. No. 905,703, filed May 15, 1978, now abandoned, the disclosure of which is incorporated herein by reference.

Surfactant

Any conventional surfactant which when mixed with an alcohol cosurfactant can be used in the tertiary recovery of oil, can be used as the surfactant in the present invention. For example, sodium petroleum sulfonates can be used as the surfactant. Preferably, however, neutralized oxidized solvent extracted oils produced by oxidizing a solvent extracted neutral oil to form a grease-like semi-solid material and then neutralizing the semi-solid material with a base such as an alkali metal hydroxide are used. Techniques for making such surfactants are described in commonly assigned application Ser. No. 97,029, filed Nov. 21, 1979, now U.S. Pat. No. 4,313,835, the disclosure of which is incorporated herein by reference.

As disclosed in said patent, solvent extracted oils are conventional petroleum refinery streams produced by extracting aromatics from various streams taken off the vacuum distillation tower of a refinery with solvents such as furfural and phenol. As further pointed out in the patent, in making the surfactant emulsifier, the solvent extracted oil which may be any solvent extracted oil having a viscosity ranging from about 50 SUS at 100° F. to 250 SUS at 210° F. is subjected to air oxidation. The reaction temperature is normally about 250° F. to 350° F. The oxidation reaction is continued until the oil exhibits an acid number of about 10 to 40 mg.

KOH per gram sample. The oxidized oil is then neutralized by reaction with an aqueous solution of an inorganic base, preferably an alkali metal hydroxide.

Concentrations

The improved emulsifier system of the present invention is made by admixing the surfactant as described above with the alcohol mixture. The surfactant/alcohol ratio can vary widely and is normally between about 0.5 to 12 parts by weight surfactant per part alcohol. Preferably, 1 to 4 parts surfactant per part alcohol are used. Most preferably, 2 parts surfactant to 1 part alcohol are used.

sene, 5.0 ml. emulsifier and 47.5 ml. of brine. For each emulsifier system, five different emulsions were produced having salt contents varying from 1% to 9%. In a similar fashion, five different emulsions were prepared using the emulsifier containing t-butanol as the alcohol.

After preparation, each of the emulsions was allowed to stand until separation occurred. At this time, the volumes of the different phases produced were measured, and the results are set forth in the following Table III.

TABLE III

Comparison of Phase Behavior of Emulsifiers Containing Mixed Alcohols and t-Butanol Surfactant: Oxidized 300 SEN; Acid No. 37.9
Neutralized at Room Temperature with 2.75 equivalents NaOH
Surfactant: Alcohol Ratio 8:1
Hyrocarbon: Kerosine 47.5 ml
Emulsifier: 5.0 ml
Brine: 47.5 ml

| % NaCl in Brine | Hydrocarbon Phase (ml) | | | Middle Phase (ml) | | | Brine Phase (ml) | | |
|---|---|---|---|---|---|---|---|---|---|
| | Mixed Alcohols $C_2$-$C_8$ | $C_3$-$C_8$ | t-butyl Alcohol | Mixed Alcohols $C_2$-$C_8$ | $C_3$-$C_8$ | t-butyl Alcohol | Mixed Alcohols $C_2$-$C_8$ | $C_3$-$C_8$ | t-butyl Alcohol |
| 1 | 44.3 | 47.1 | 46.3 | 0.0 | 0.0 | 0.0 | 55.7 | 52.9 | 53.7 |
| 3 | 39.7 | 38.8 | 41.7 | 32.2 | 30.6 | 0.0 | 28.1 | 30.6 | 58.3 |
| 5 | 39.3 | 37.7 | 38.8 | 23.0 | 23.0 | 23.2 | 37.7 | 39.3 | 38.0 |
| 7 | 37.3 | 38.6 | 38.8 | 22.0 | 22.1 | 19.9 | 40.7 | 39.3 | 41.3 |
| 9 | 36.9 | 36.0 | 34.7 | 20.5 | 18.9 | 20.7 | 42.6 | 45.1 | 44.6 |

EXAMPLES

EXAMPLE 1

In order to compare the phase behavior of a mixture of alcohols with t-butanol as cosurfactants, three different emulsifier systems were prepared, two of the emulsifier systems using alcohol mixtures in accordance with the present invention and the third emulsifier system using t-butanol in accordance with the prior art. The surfactant in each of the emulsifier systems was composed of a neutralized oxidized oil prepared by air oxidizing SEN-300 to form a product having an acid number of 37.9 and then neutralizing the product at room temperature with 2.75 equilvalents of NaOH. The emulsifier systems were formed by combining 8 parts of this surfactant with 1 part of the alcohol. One of the alcohol mixtures contained alcohols having from 2 to 8 carbon atoms and the other alcohol mixture contained alcohols having from 3 to 8 carbon atoms. The compositions of these alcohol mixtures are set forth in the following Table II.

TABLE II

| | Parts By Weight | |
|---|---|---|
| | $C_2$-$C_8$ | $C_3$-$C_8$ |
| Ethanol | 8.80 | — |
| Acetone | 2.00 | — |
| Isopropanol | 2.50 | 2.80 |
| Normal Propanol | 11.01 | 12.34 |
| Secondary Butanol | 3.70 | 4.15 |
| Isobutanol | 42.96 | 48.16 |
| Normal Butanol | 7.31 | 8.20 |
| Normal Pentanol | 8.21 | 9.20 |
| Normal Hexanol | 7.21 | 8.20 |
| Octanol | 6.20 | 6.95 |

In order to test the surfactants, a series of emulsions was produced, each emulsion comprising 47.5 ml. kerosene, 5.0 ml. emulsifier and 47.5 ml. of brine. For each emulsifier system, five different emulsions were produced having salt contents varying from 1% to 9%. In a similar fashion, five different emulsions were prepared using the emulsifier containing t-butanol as the alcohol.

As will be noted from Table III, at 1% brine level, essentially all of the emulsifier is in the brine phase, regardless of the alcohol used. However, at 3% brine a third phase forms when alcohol mixtures are used as the cosurfactant whereas no third phase form when t-butanol is the cosurfactant. As 5%, 7% and 9% brine, all three emulsifiers produce three phases. The formation of the third phase, i.e. the emulsifier phase, implies that the emulsifiers will result in low interfacial tensions required for enhanced oil recovery. Most importantly, the mixture of alcohols produce the all important third phase over wider range of brine concentration. Thus they can be used successfully in a wider range of field concentrations.

EXAMPLE 2

A neutralized oxidized solvent extract oil surfactant was prepared by air oxidizing SEN-300 to a saponification number of 147.9 and neutralizing the product at 105° C. to 132° C. with an amount of NaOH equivalent to the saponification number. Two emulsifier systems were prepared with this surfactant, the $C_3$-$C_8$ alcohol mixture described in Example 1 being used as the cosurfactant in one emulsifier system and t-butanol being used as the cosurfactant in the other system. In both systems, the surfactant/alcohol ratio was 2:1.

A series of emulsions was prepared with each emulsifier system, each emulsion containing 6 ml. of emulsifier, 47 ml. dodecane and 47 ml. of a brine whose salt concentration varied from 1 12%. After preparation, the emulsions were allowed to separate and the amounts of the various phases formed were measured. The results obtained are set forth in the following Table IV.

TABLE IV

Comparison of Phase Behavior of
Emulsifiers Containing Mixed Alcohols and t-Butanol

| Surfactant: | Oxidized 300 SEN; Saponification No.; 147.9 Neutralized at 105° C. to 132° C. with NaOH equivalent to saponification number. |
| --- | --- |
| Surfactant: | Alcohol Ratio 2:1 |
| Hydrocarbon: | Dodecane 47.0 ml |
| Emulsifier: | 6.0 ml |
| Brine: | 47.0 ml |

| | | | ml | | | |
| --- | --- | --- | --- | --- | --- | --- |
| | | | Middle Phase | | Brine Phase | |
| % NaCl | Hydrocarbon Phase | | $C_3$-$C_8$ | t-butyl | $C_3$-$C_8$ | t-butyl |
| in Brine | $C_3$-$C_8$ Alcohol | t-butyl Alcohol | Alcohol | Alcohol | Alcohol | Alcohol |
| 1 | 48.0 | 46.0 | 0.0 | 0.0 | 52.0 | 54.0 |
| 2 | 46.0 | 45.7 | 0.0 | 0.0 | 54.0 | 54.3 |
| 3 | 46.7 | 45.3 | 8.0 | 0.0 | 45.3 | 54.7 |
| 4 | 46.0 | 45.3 | 9.0 | 3.4 | 45.0 | 51.3 |
| 5 | 45.3 | 45.6 | 8.0 | 2.7 | 46.7 | 51.7 |
| 6 | 45.4 | 45.7 | 7.3 | 5.0 | 47.3 | 49.3 |
| 7 | 44.7 | 45.7 | 7.3 | 6.3 | 48.0 | 48.0 |
| 8 | 44.7 | 45.7 | 7.0 | 5.6 | 48.3 | 48.7 |
| 9 | 44.7 | 45.7 | 7.3 | 5.6 | 48.0 | 48.7 |
| 10 | 46.4 | 45.3 | 7.3 | 6.0 | 46.3 | 48.7 |
| 11 | 45.4 | 45.3 | 7.3 | 6.0 | 47.3 | 48.7 |
| 12 | 44.7 | 45.3 | 7.3 | 5.7 | 48.0 | 49.0 |

As will be noted from Table IV, the emulsifier system formed with a mixture of alcohols produced a third phase that is stable over a broader range of brine concentration than t-butanol. Equally importantly, the emulsifier produced using the mixed alcohols produces a greater volume of the third phase. This indicates that it is more effective in solubilizing both hydrocarbon and brine. This is another indication that an emulsifier made with mixed alcohols will result in lower interfacial tensions.

EXAMPLE 3

A series of emulsions was produced using the two emulsifier systems of Example 2. A series of emulsions was formed using dodecane as the hydrocarbon and an equal amount of a sodium chloride brine as the aqueous phase. In those emulsions in which the emulsifier was formulated with t-butanol, the brine was 7% in NaCl while in those emulsions prepared using an emulsifier formulated with the mixed alcohols the brine was 5% in NaCl. After formulation, the emulsions were allowed to stand and the amounts of the different phases produced were determined. The results obtained are set forth in the following Table V.

TABLE V

Effect of Emulsifier Concentration on the Phase
Behavior of Emulsifiers Containing Mixed Alcohols and t-Butanol

| Surfactant: | Oxidized 300 SEN; Saponification No.: 147.9 Neutralized at 105° C. to 132° C. with NaOH equivalent to saponification number. |
| --- | --- |
| Surfactant: | Alcohol Ratio 2:1 |
| Brine Con.: | 7% for emulsifier with t-butanol 5% for emulsifier with mixed alcohol |
| Hydrocarbon: | Dodecane |

| | | ml | | | | |
| --- | --- | --- | --- | --- | --- | --- |
| | | | Middle Phase | | Brine Phase | |
| % Emulsifier | Hydrocarbon Phase | | $C_3$-$C_8$ | t-butyl | $C_3$-$C_8$ | t-butyl |
| | $C_3$-$C_8$ Alcohol | t-butyl Alcohol | Alcohol | Alcohol | Alcohol | Alcohol |
| 6 | 45.3 | 45.7 | 8.0 | 6.3 | 46.7 | 48.0 |
| 8 | 45.0 | 45.3 | 12.3 | 8.0 | 42.7 | 46.7 |
| 10 | 43.4 | 44.4 | 13.3 | 10.3 | 43.3 | 45.3 |

TABLE V-continued

Effect of Emulsifier Concentration on the Phase
Behavior of Emulsifiers Containing Mixed Alcohols and t-Butanol

| Surfactant: | Oxidized 300 SEN; Saponification No.: 147.9 Neutralized at 105° C. to 132° C. with NaOH equivalent to saponification number. |
| --- | --- |
| Surfactant: | Alcohol Ratio 2:1 |
| Brine Con.: | 7% for emulsifier with t-butanol 5% for emulsifier with mixed alcohol |
| Hydrocarbon: | Dodecane |

| | | ml | | | | |
| --- | --- | --- | --- | --- | --- | --- |
| | | | Middle Phase | | Brine Phase | |
| % Emulsifier | Hydrocarbon Phase | | $C_3$-$C_8$ | t-butyl | $C_3$-$C_8$ | t-butyl |
| | $C_3$-$C_8$ Alcohol | t-butyl Alcohol | Alcohol | Alcohol | Alcohol | Alcohol |
| 12 | 42.0 | 45.7 | 16.3 | 12.0 | 41.7 | 42.3 |
| 14 | 41.4 | 45.7 | 19.3 | 12.6 | 39.3 | 41.7 |

As will be noted from the above table, the amount of emulsifier phase formed using t-butanol is essentially equivalent to the amount of emulsifier added. However, when the emulsifier is formulated with a mixture of alcohols, the amount of third phase formed is 30% greater. This is still another indication of the superiority of the mixture of alcohols as cosurfactants.

EXAMPLE 4

Example 2 was repeated except that the surfactant was produced by air oxidizing SEN-300 to a saponification number of 128.9 and neutralizing with NaOH at 110° C. to 127° C. The results obtained are set forth in the following Table IV.

TABLE VI

Comparison of Phase Behavior of
Emulsifiers Containing Mixed Alcohols and t-Butanol

| Surfactant: | Oxidized 300 SEN; Saponification No.: 128.9 Neutralized at 110° C. to 127° C. with NaOH equivalent to saponification number. |
| --- | --- |
| Surfactant: | Alcohol Ratio 2:1 |
| Hydrocarbon: | Dodecane 47.0 ml |
| Emulsifier: | 6.0 ml |
| Brine: | 47.0 ml |

| | | | ml | | | |
| --- | --- | --- | --- | --- | --- | --- |
| | | | Middle Phase | | Brine Phase | |
| % NaCl | Hydrocarbon Phase | | $C_3$-$C_8$ | t-butyl | $C_3$-$C_8$ | t-butyl |
| in Brine | $C_3$-$C_8$ Alcohol | t-butyl Alcohol | Alcohol | Alcohol | Alcohol | Alcohol |
| 1 | 46.7 | 47.0 | 0.0 | 0.0 | 53.3 | 53.0 |
| 2 | 45.7 | 46.7 | 0.0 | 0.0 | 54.3 | 53.3 |
| 3 | 45.6 | 46.7 | 9.7 | 0.0 | 44.7 | 53.3 |
| 4 | 45.0 | 47.0 | 9.0 | 1.3 | 46.0 | 51.7 |
| 5 | 44.6 | 46.3 | 7.7 | 5.0 | 47.7 | 48.7 |
| 6 | 43.7 | 46.3 | 8.0 | 5.7 | 48.3 | 48.0 |

Again, it can be seen that the third phase produced in the emulsions is stable over a wider range of brine concentrations when the emulsifier system is formulated using mixed alcohols as the cosurfactant. Moreover, the third phase is also larger when mixed alcohols are used.

EXAMPLE 5

Example 3 was repeated except that the surfactant was the surfactant described in Example 4 and the brine concentration was 8% for the emulsifier formulated with t-butanol and 4% for the emulsifier formulated with the mixed alcohol. The results obtained are set forth in the following Table VII.

TABLE VII

Effect of Emulsifier Concentration on the Phase Behavior of Emulsifiers Containing Mixed Alcohols an t-Butanol Surfactant: Oxidized 300 SEN; Saponification No.: 147.9 Neutralized at 110° C. to 127° C. with NaOH equivalent to saponification number.
Surfactant: Alcohol Ratio 2:1
Brine Con.: 8% for emulsifier with t-butanol
4% for emulsifier with mixed alcohol
Hydrocarbon: Dodecane

| | ml | | | | | |
|---|---|---|---|---|---|---|
| | Hydrocarbon Phase | | Middle Phase | | Brine Phase | |
| % Emulsifier | $C_3$–$C_8$ Alcohol | t-butyl Alcohol | $C_3$–$C_8$ Alcohol | t-butyl Alcohol | $C_3$–$C_8$ Alcohol | t-butyl Alcohol |
| 6 | 45.0 | 45.3 | 9.0 | 6.0 | 46.0 | 48.7 |
| 8 | 44.0 | 45.3 | 12.0 | 8.0 | 44.0 | 46.7 |
| 10 | 43.0 | 45.3 | 15.0 | 8.7 | 42.0 | 46.7 |
| 12 | 41.3 | 45.0 | 16.7 | 11.0 | 42.0 | 44.0 |
| 14 | 40.0 | 44.6 | 20.0 | 12.7 | 40.0 | 42.7 |

Again it can be seen that the volume of the middle phase is equal to or less than the amount of emulsifier in the system when the emulsifier is formulated with t-butanol but when the emulsifier is formulated with a mixed alcohol the amount of middle phase is about 1.5 times the amount of emulsifier. This again is clear indication of the superiority of the emulsifier using the mixture of alcohols as surfactant.

EXAMPLE 6

The interfacial tensions of the two emulsifier systems of Example 3 and the two emulsifier systems of Example 5 in the respective emulsions exhibiting optimal salinity were determined. The results are set forth in the following Table VIII.

TABLE VIII

Effect of Alcohol on Interfacial Tension

Surfactant: Oxidized 300 SEN Neutralized hot with NaOH equivalent to saponification number
Surfactant: Alcohol ratio 2:1
Hydrocarbon: Dodecane

| Alcohol | Optimal Salinity % NaCl | % Emulsifier | Oxidized Oil Sap. No. | Interfacial Tension dynes/cm | | |
|---|---|---|---|---|---|---|
| | | | | YMW | YOM | YOW |
| t-butanol | 7 | 10 | 147.1 | 0.0573 | too dark | — |
| $C_3$–$C_8$ | 5 | 14 | 147.1 | 0.0238 | too dark | 0.0425 |
| t-butanol | 8 | 14 | 128.9 | 0.1212 | 0.0432 | — |
| $C_3$–$C_8$ | 4 | 14 | 128.9 | 0.0179 | 0.0025 | 0.0253 |

As can be seen, although the emulsifiers formulated with alcohol mixtures exhibit a lower optimal salinity, they also result in a lower interfacial tension. In the emulsifier system using the surfactant produced from SEN-300 oxidized to a saponification number of 147.9, the interfacial tension between the middle and aqueous phases was cut in half by using the alcohol mixture. A measurement could not be made by using the middle and hydrocarbon phase because the system was too dark. With the emulsifier produced using a surfactant made from SEN-300 oxidized to a saponification number of 128.9, the interfacial tensions (both middle phase-water and middle phase-hydrocarbon) are an order of magnitude lower than the corresponding t-butanol emulsifier system. This demonstrates very conclusively the superiority of mixtures of alcohols as the cosurfactants.

Although only a few embodiments of the present invention have been described above, many modifications can be made without departing from the spirit and scope of the invention. All such modifications are intended to be included within the scope of the present invention, which is to be limited only by the following claims.

We claim:

1. In an emulsifier system for use in the tertiary recovery of oil comprising about 0.5 to 12 parts by weight of a surfactant and one part by weight of an alcohol cosurfactant, said surfactant being a neutralized air-oxidized solvent extracted oil wherein the solvent extracted oil has a viscosity between about 50 SUS at 100° F. and 250 SUS at 210° F., wherein the oxidation reaction is conducted at a temperature from about 250° F. to 350° F. and wherein the oxidized oil has an acid number of 10–40 before neutralization the improvement wherein said alcohol cosurfactant comprises a mixture of alkanols having from 2 to 8 carbon atoms, wherein the mixture contains no more than 55 percent of any one alcohol and has the following alcohol distribution:

$C_2$—0–25%
$C_3$—9–25%
$C_4$—40–70%
$C_5$—0.1–12%
$C_6$—0.1–10%
$C_8$—0.1–10%, and wherein said emulsifier system forms an emulsified phase comprising emulsifier, solubilized hydrocarbon, and brine over a range of brine concentrations of at least 5 weight percent NaCl in water.

2. The emulsifier system of claim 1 wherein said mixture is made by contacting synthesis gas with a copper/thorium/alkali metal oxide catalyst.

* * * * *